United States Patent [19]

Pellet et al.

[11] Patent Number: 4,711,864

[45] Date of Patent: Dec. 8, 1987

[54] CATALYTIC CRACKING CATALYST

[75] Inventors: Regis J. Pellet, Croton-On-Hudson; Richard J. Hinchey, Thornwood, both of N.Y.

[73] Assignee: Union Carbide Corporation, Dandury, Conn.

[21] Appl. No.: 721,894

[22] Filed: Apr. 11, 1985

Related U.S. Application Data

[63] Continuation of Ser. No. 500,446, Jun. 2, 1983, abandoned.

[51] Int. Cl.$^4$ .............................................. B01J 29/08
[52] U.S. Cl. ....................................... 502/65; 502/64; 502/73
[58] Field of Search .............................. 502/65, 64, 73

[56] References Cited

U.S. PATENT DOCUMENTS

| | | | |
|---|---|---|---|
| 3,130,007 | 4/1964 | Breck | 23/113 |
| 3,216,789 | 11/1965 | Breck et al. | 23/113 |
| 3,431,219 | 3/1969 | Argauer | 502/61 |
| 3,436,174 | 4/1969 | Sand | 23/113 |
| 3,640,681 | 2/1972 | Pickert | 23/111 |
| 3,702,886 | 11/1972 | Argauer et al. | 423/328 |
| 4,093,560 | 6/1978 | Kerr et al. | 252/455 Z |
| 4,377,468 | 3/1983 | LaPierre et al. | 208/111 |
| 4,452,908 | 6/1984 | Ball et al. | 502/61 |
| 4,487,843 | 11/1984 | Telford et al. | 502/61 X |
| 4,503,023 | 3/1985 | Breck et al. | 423/328 |

OTHER PUBLICATIONS

Zeolite Molecular Sieves, D. W. Breck, pp. 507–518.

*Primary Examiner*—Carl F. Dees

[57] ABSTRACT

Catalytic cracking catalysts, the process of their preparation and the process of their use.

20 Claims, No Drawings

CATALYTIC CRACKING CATALYST

This application is a continuation of prior U.S. application Ser. No. 500,446, filed June 2, 1983, now abandoned.

FIELD OF THE INVENTION

The present invention relates to cracking catalysts and the process of their use. The cracking catalysts are derived from novel zeolitic aluminosilicates set forth in copending U.S. Ser. No. 315,853, filed Oct. 28, 1981 now U.S. Pat. No. 4,503,023.

BACKGROUND OF THE INVENTION

The prior art dealing with catalytic cracking catalysts is voluminous with a basic goal being the preparation of modified zeolites for use as cracking catalysts. The prior art tends to deal with various ways in which the activity and stability of the catalyst may be improved.

It has been disclosed that the steam and thermal stability of zeolites can be improved by the use of zeolites having a low level of alkali metal content and a unit cell size less than about 24.45 Angstroms (See: U.S. Pat. Nos. 3,293,192 and Re. 28,629 (Reissue of U.S. Pat. No. 3,402,996)).

Further, it has been disclosed (U.S. Pat. No. 3,591,488) that the hydrogen or ammonium form of a zeolite may be treated with $H_2O$ at a temperature ranging from about 800° to about 1500° F., and then subsequently cation exchange the steam and water treated zeolite with cations which may be rare earth metal cations. The method increases the silica to alumina mole ratio of the zeolite and also the defect structure.

Another approach taken in an attempt to improve catalytic activity for faujasite-type zeolites is disclosed in U.S. Pat. No. 4,224,188 where the patentee discloses that improved catalytic activity of faujasite-type zeolites can be obtained if the zeolite is first aluminum exchanged and then ammonium exchanged. It is interesting to note that if the ammonium exchange was carried out before the aluminum exchange that no improvement in activity or thermal stability was observed. This is consistent with the publication of K. M. Wang et al. at *J. Catal.* 24, 262 (1972) which teaches that the hydrogen form of zeolite Y is unstable to hydrothermal treatment when such are aluminum exchanged.

U.S. Pat. No. 4,219,466 purports to disclose that ion-exchange (ammonium, aluminum and rare earth cations) of a silica-alumina hydrogel which contains a zeolite gives a catalyst with improved characteristics. The examples with respect to aluminum exchanged materials show that the aluminum exchange exhibited no improvement as a catalyst.

In copending U.S. Ser. No. 657,417 filed Oct. 3, 1984, there is disclosed improved cracking catalysts derived from Zeolite LZ-210, as disclosed in U.S. Pat. No. 4,503,023 which issued on Mar. 5, 1985. The instant invention relates to Group IIIA ion-exchanged LZ-210 based catalysts.

SUMMARY OF THE INVENTION

The process for the catalytic cracking of a crude oil feedstock to produce lower boiling hydrocarbons which comprises contacting said feedstock with a zeolitic aluminosilicate which has a mole ratio of oxide in the dehydrated state of $$(0.85-1.1)M_{2/n}O:Al_2O_3:xSiO_2$$

wherein M is a cation having a valence of "n"; x has a value greater than 6.0; having a X-ray powder diffraction pattern having at least the d-spacings of Table A; having extraneous silicon atoms in the crystal lattice in the form of framework $SiO_4$ tetrahedra, wherein said aluminosilicate has been ion-exchanged with Group IIIA cations. In addition, the Group IIIA exchanged LZ-210 may be heated for an effective temperature and for effective time in the presence of an effective amount of steam, and/or may be ion-exchanged with a multivalent cation other than Group IIIA, e.g. rare earth, to provide catalyst compositions.

DETAILED DESCRIPTION OF THE INVENTION

The present invention relates to new catalytic cracking catalysts, their method of preparation and to the process of their use in catalytic cracking processes.

The catalytic cracking catalysts of the instant invention are derived from a novel class of zeolitic aluminosilicates denominated LZ-210 in copending U.S. Ser. No. 315,853, filed Oct. 28, 1981, said application being incorporated herein by reference thereto.

It has been discovered that LZ-210 may be ion-exchanged with Group IIIA cations to give zeolites which when employed in catalytic cracking catalysts have improved catalytic stability and, accordingly, are believed to have long catalyst life when employed in cracking catalyst formulations.

The catalysts of the present invention will be referred to herein, solely for the purpose of reference herein, as LZ-210-A to denominate an LZ-210 composition ion-exchanged with a Group IIIA cation-containing solution. Other components and processing steps may be provided with LZ-210-A to provide the final catalytic cracking catalyst and exemplary of such other components and/or processing steps will be discussed hereinafter.

LZ-210-A compositions are prepared using LZ-210 as described in U.S. Ser. No. 315,853, above mentioned with a general description of LZ-210 being as follows:

LZ-210

Aluminosilicates having in the dehydrated state, a chemical composition expressed in terms of mole ratios of oxides as $$(0.85-1.1)M_{2/n}O:Al_2O_3:xSiO_2$$

wherein "M" is a cation having the valence "n"; and "x" has a value greater than 6, preferably greater than 7.0; having an X-ray powder diffraction pattern having at least the d-spacings set forth in Table A, below; and having extraneous silicon atoms in its crystal lattice in the form of $SiO_4$ tetrahedra, preferably in an average amount of at least 1.0 per 10,000$A^3$.

For purposes of reference herein the framework composition are best expressed in terms of mole fractions of framework tetrahedra $TO_2$. The starting zeolite may be expressed as:

$$(Al_aSi_b\square_c)O_2$$

whereas "a" is the mole fraction of aluminum tetrahedra in the framework; "b" is the mole fraction of silicon tetrahedra in the framework; $\square$ denotes defect sites and "z" is the mole fraction of defect sites in the zeolite framework. In many cases the "z" value for the starting zeolite is zero and the defect sites are simply eliminated from the expression. Numerically the sum of the values $a+b+z=1$.

The zeolite product of the fluorosilicate treatment, expressed in terms of mole fraction of framework tetrahedra ($TO_2$) will have the form $$[Al_{(a-N)} Si_{b+(N-\Delta z)} \square_z] O_2$$

wherein: "N" is defined as the mole fraction of aluminum tetrahedra removed from the framework during the treatment; "a" is the mole fraction of aluminum tetrahedra present in the framework of the starting zeolite; "b" is the mole fraction of silicon tetrahedra present in the framework of the starting zeolite; "z" is the mole fraction of defect sites in the framework; $(N-\Delta z)$ is the mole fraction increase in silicon tetrahedra resulting from the fluoro-silicate treatment; "$\Delta z$" is the net change in the mole fraction of defect sites in the zeolite framework resulting from the treatment $\Delta z = z$ (product zeolite) $- z$ (starting zeolite) The term "Defect Structure Factor" for any given zeolite is equivalent to the "z" value of the zeolite. The net change in Defect Structure Factors between the starting zeolite and the product zeolite is equivalent to "$\Delta z$". Numerically, the sum of the values is represented by:

$$(a-N)+[b+(N-\Delta z)\times z=1$$

A subclass of the above LZ-210 compositions, i.e. those which are characterized by having both high molar $SiO_2/Al_2O_3$ ratios and low Defect Structure Factors (as hereinafter discussed), can be defined as having a chemical composition expressed in terms of mole fractions of framework tetrahedra as:

$$[Al_{(a-N)}Si_{b+(N-\Delta z)}\square_{z\text{-}}]O_2$$

wherein: the mole fraction of aluminum removed from the framework of the starting zeolite is "N";

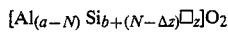

has a value greater than 6, preferably greater than 7.0; the change in defect structure factor $\Delta z$ is less than 0.08 and preferably less than 0.05; an increased silicon content in the framework,

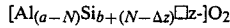

of at least 0.5; and a cation equivalent expressed as a monovalent cation species, $M^+/Al$, from 0.85 to 1.1 and the characteristic crystal structure of zeolite Y as indicated by an X-ray powder diffraction pattern having at least the d-spacings set forth broadly in Table A.

TABLE A

| d(A) | Intensity |
|---|---|
| 14.3–13.97 | very strong |
| 8.71–8.55 | medium |
| 7.43–7.30 | medium |
| 5.66–5.55 | strong |
| 4.75–4.66 | medium |
| 4.36–4.28 | medium |

TABLE A-continued

| d(A) | Intensity |
|---|---|
| 3.75–3.69 | strong |
| 3.30–3.23 | strong |
| 2.85–2.79 | strong |

Zeolite LZ-210 as defined above will have cubic unit cell dimension, $a_o$, of less than 24.61 Angstroms, an adsorption capacity for water vapor at 25° C. and 4.6 Torr water vapor pressure of at least 20 weight percent based on the anhydrous weight of the zeolite, and preferably an oxygen adsorption capacity at 100 Torr and $-183°$ C. of at least 25 weight percent.

LZ-210 can be prepared by a method which removes framework aluminum from a zeolite having $SiO_2/Al_2O_3$ molar ratios of about 3 or greater and substituting therefor silicon from a source extraneous to the starting zeolite. By such a procedure it is possible to create more highly siliceous zeolite species which have the same crystal structure as would result by direct synthesis if such synthesis method were known. The process disclosed in copending U.S. Ser. No. 315,853 comprises contacting a crystalline zeolite having pore diameters of at least about 3 Angstroms and having a molar $SiO_2/Al_2O_3$ ratio of at least 3, with a fluorosilicate salt, preferably in an amount of at least 0.0075 moles per 100 grams of zeolite starting material, said fluorosilicate salt being in the form of an aqueous solution having a pH value in the range of 3 to about 7, preferably 5 to about 7, and brought into contact with the zeolite either incrementally or continuously at a slow rate whereby framework aluminum atoms of the zeolite are removed and replaced by extraneous silicon atoms from the added fluorosilicate.

LZ-210 can be prepared from a conventionally prepared zeolite Y which has a molar $SiO_2/Al_2O_3$ ratio of less than 6 by using the above process to increase the $SiO_2/Al_2O_3$ ratio greater than 6. A preferred procedure comprises:
(a) providing a zeolite Y composition having a molar $SiO_2/Al_2O_3$ ratio less than that of the final product and preferably less than 6.0;
(b) contacting and reacting at a temperature of from 20° to 95° C., said zeolite Y with a fluorosilicate, preferably ammonium fluorosilicate; the fluorosilicate solution, being in the form of an aqueous solution at a pH in the range of 5 to about 7, is brought into contact with the zeolite either incrementally or continuously at a slow rate such that a sufficient proportion of the framework aluminum atoms removed are replaced by silicon atoms to retain at least 80 percent, preferably at least 90 percent, of the crystal structure of the starting zeolite Y; and
(c) isolating the zeolite having an enhanced framework silicon content from the reaction mixture.

The starting zeolite Y composition can be synthesized by any of the processes well known in the art. A representative process is disclosed in U.S. Pat. No. 3,130,007.

For reasons more fully explained hereinafter, it is necessary that the starting zeolite be able to withstand the initial loss of framework aluminum atoms to at least a modest degree without collapse of the crystal structure unless the process is to be carried out at a very slow pace. Accordingly it is preferred that the value for "x" in the formula above be at least about 3.0. Also it is preferred that at least about 50, and more preferably at least 95%, of the $AlO_4$ tetrahedra of the naturally occurring or as-synthesized zeolite are present in the starting zeolite. Most advantageously the starting zeolite contains as many as possible of its original $AlO_4$ tetrahedra, i.e. has not been subjected to any post-formation treatment which either extensively removes aluminum atoms from their original framework sites or converts them from the normal conditions of 4-fold coordination with oxygen.

The cation population of the starting zeolite is not a critical factor insofar as substitution of silicon for framework aluminum is concerned, but since the substitution mechanism involves the in situ formation of salts of at least some of the zeolitic cations, it is advantageous that these salts be water-soluble to a substantial degree to facilitate their removal from the silica-enriched zeolite product. It is found that ammonium cations for the most soluble salt in this regard and it is accordingly preferred that at least 50 percent, most preferably 85 or more percent, of the zeolite cations be ammonium cations. Sodium and potassium, two of the most common original cations in zeolites are found to form $Na_3AlF_6$ and $K_3AlF_6$ respectively, both of which are only very sparingly soluble in either hot or cold water. When these compounds are formed as precipitates within the structural cavities of the zeolite they are quite difficult to remove by water washing. Their removal, moreover, is important if thermal stability of the zeolite product is desired since the substantial amounts of fluoride can cause crystal collapse at temperatures as low as 500° C.

The fluorosilicate salt used as the aluminum extractant and also as the source of extraneous silicon which is inserted into the zeolite structure in place of the extracted aluminum can be any of the fluorosilicate salts having the general formula $$(A)_{2/b}SiF_6$$

wherein A is preferably a metallic or non-metallic cation other than $H^+$ having the valence "b". Cations represented by "A" are alkylammonium, $NH_4^+$, $Mg^{++}$, $Li^+$, $Na^+$, $K^+$, $Ba^{++}$, $Cd^{++}$, $Cu^+$, $H^+$, $Cu^{++}$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$, and $Zn^{++}$. The ammonium cation form of the fluorosilicate is highly preferred because of its substantial solubility in water and also because the ammonium cations form water soluble by-product salts upon reaction with the zeolite, namely $(NH_4)_3AlF_6$.

In certain respects, the manner in which the fluorosilicate and starting zeolite are brought into contact and the overall process of substituting silicon for aluminum in the zeolite framework is a two step process in which the aluminum extraction step will, unless controlled, proceed very rapidly while the silicon insertion is relatively very slow. If dealumination becomes too extensive without silicon substitution, the crystal structure becomes seriously degraded and ultimately collapses. While we do not wish to be bound by any particular theory, it appears that the fluoride ion is the agent for the extraction of framework aluminum in accordance with the equation

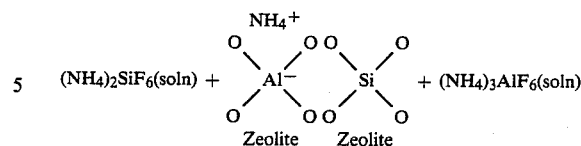

It is, therefore, essential that the initial dealumination step be inhibited and the silicon insertion step be promoted to achieve the desired zeolite product. It is found that the various zeolite species have varying degrees of resistance toward degradation as a consequence of framework aluminum extraction without silicon substitution. In general the rate of aluminum extraction is decreased as the pH of the fluorosilicate solution in contact with the zeolite is increased within the range of 3 to 7, and as the concentration of the fluorosilicate in the reaction system is decreased. Also increasing the reaction temperature tends to increase the rate of silicon substitution. Whether it is necessary or desirable to buffer the reaction system or strictly limit the fluorosilicate concentration is readily determined for each zeolite species by routine observation.

Theoretically, there is no lower limit for the concentration of fluorosilicate salt in the aqueous solution employed, provided of course the pH of the solution is high enough to avoid undue destructive acidic attack on the zeolite structure apart from the intended reaction with the fluorosilicate. Very slow rates of addition of fluorosilicate salts insure that adequate time is permitted for the insertion of silicon as a framework substitute for extracted aluminum before excessive aluminum extraction occurs with consequent collapse of the crystal structure. Practical commercial considerations, however, require that the reaction proceed as rapidly as possible, and accordingly the conditions of reaction temperature and reagent concentrations should be optimized with respect to each zeolite starting material. In general the more highly siliceous the zeolite, the higher the permissible reaction temperature and the lower the suitable pH conditions. In general the preferred reaction temperature is within the range of 50° to 95° C., but temperatures as high as 125° C. and as low as 20° C. have been suitably employed in some instances. At pH values below about 3 crystal degradation is generally found to be unduly severe, whereas at pH values higher than 7, silicon insertion is unduly slow. The maximum concentration of fluorosilicate salt in the aqueous solution employed is, of course, interdependent with the temperature and pH factors and also with the time of contact between the zeolite and the solution and the relative proportions of zeolite and fluorosilicate. Accordingly it is possible that solutions having fluorosilicate concentrations of from about $10_{-3}$ moles per liter of solution up to saturation can be employed, but it is preferred that concentrations in the range of 0.5 to 1.0 moles per liter of solution be used. These concentration values are with respect to true solutions, and are not intended to apply to the total fluorosilicate in slurries of salts in water. As illustrated hereinafter, even very slightly soluble fluorosilicates can be slurried in water and used as a reagent—the undissolved solids being readily available to replace dissolved molecular species consumed in reaction with the zeolite. As stated hereinabove, the amount of dissolved fluorosilicates employed with respect to the particular zeolite being treated will depend to some extent upon the physical and chemical properties of the individual zeolites as well as other specifications herein contained in this application. However, the minimum value for the amount of fluorosilicate to be added should be at least equivalent to the minimum mole fraction of aluminum to be removed from the zeolite.

In this disclosure, including the appended claims, in specifying proportions of zeolite starting material or adsorption properties of the zeolite product, and the like, the anhydrous state of the zeolite will be intended unless otherwise stated. The anhydrous state is considered to be that obtained by heating the zeolite in dry air at 100° C. for about 1 to 2 hours.

It is apparent from the foregoing that, with respect to reaction conditions, it is desirable that the integrity of the zeolite crystal structure is substantially maintained throughout the process, and that in addition to having extraneous (non-zeolitic) silicon atoms inserted into the lattice, the zeolite retains at least 60 and preferably at least 90 percent of its original crystallinity. A convenient technique for assessing the crystallinity of the products relative to the crystallinity of the starting material is the comparison of the relative intensities of the d-spacings of their respective X-ray powder diffraction patterns. The sum of the peak heights, in terms of arbitrary units above background, of the starting material is used as the standard and is compared with the corresponding peak heights of the products. When, for example, the numerical sum of the peak heights of the product is 85 percent of the value of the sum of the peak heights of the starting zeolite, then 85 percent of the crystallinity has been retained. In practice it is common to utilize only a portion of the d-spacing peaks for this purpose, as for example, five of the six strongest d-spacings. In zeolite Y these d-spacings correspond to the Miller Indices 331, 440, 533, 642 and 555. Other indicia of the crystallinity retained by the zeolite product are the degree of retention of surface area and the degree of retention of the adsorption capacity. Surface areas can be determined by the well-known Brunauer-Emmett-Teller method (B-E-T). J. Am. Chem. Soc. 60 309 (1938) using nitrogen as the adsorbate. In determining the adsorption capacity, the capacity for oxygen at −183° C. at 100 Torr is preferred.

All available evidence, to date, indicates that the above described process is unique in being able to produce zeolites essentially free of defect structure yet having molar $SiO_2/Al_2O_3$ ratios higher than those heretofore obtained by direct hydrothermal synthesis i.e., no other process is known to date for preparing LZ-210. The products resulting from the operation of the process share the common characteristic of having a higher molar $SiO_2/Al_2O_3$ ratio than previously obtained for each species by direct hydrothermal synthesis by virtue of containing silicon from an extraneous, i.e. non-zeolitic, source, preferably in conjunction with a crystal structure which is characterized as containing a low level of tetrahedral defect sites. This defect structure, if present, is revealed by the infrared spectrum of zeolites in the hydroxyl-stretching region.

In untreated, i.e. naturally occurring or as-synthesized zeolites the original tetrahedral structure is conventionally represented as

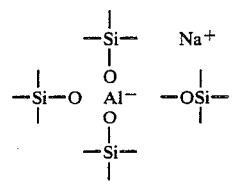

After treatment with a complexing agent such as ethylene-diaminetetraacetic acid ($H_4$ EDTA) in which a stoichiometric reaction occurs whereby framework aluminum atoms along with an associated cation such as sodium is removed as NaAlEDTA, it is postulated that the tetrahedral aluminum is replaced by four protons which form a hydroxyl "nest", as follows:

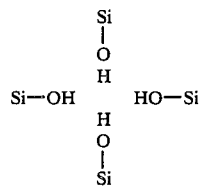

The infrared spectrum of the aluminum depleted zeolite will show a broad nondescript adsorption band beginning at about 3750 cm$^{-1}$ and extending to about 3000 cm$^{-1}$. The size of this absorption band or envelope increases with increasing aluminum depletion of the zeolite. The reason that the absorption band is so broad and without any specific absorption frequency is that the hydroxyl groups in the vacant sites in the framework are coordinated in such a way that they interact with each other (hydrogen bonding). The hydroxyl groups of adsorbed water molecules are also hydrogen-bonded and produce a similar broad absorption band as do the "nest" hydroxyls. Also, certain other zeolitic hydroxyl groups, exhibiting specific characteristic absorption frequencies within the range of interest, will if present, cause infrared absorption bands in these regions which are superimposed on the band attributable to the "nest" hydroxyl groups. These specific hydroxyls are created by the decomposition of ammonium cations or organic cations present in the zeolite.

It is, however, possible to treat zeolites, prior to subjecting them to infrared analysis, to avoid the presence of the interferring hydroxyl groups and thus be able to observe the absorption attributable to the "nest" hydroxyls only. The hydroxyls belonging to adsorbed water were avoided by subjecting the hydrated zeolite sample to vacuum activation at a moderate temperature of about 200° C. for about 1 hour. This treatment permits desorption an removal of the adsorbed water. Complete removal of adsorbed water can be ascertained by noting when the infrared absorption band at about 1640 cm$^{-1}$, the bending frequency of water molecules, has been removed from the spectrum.

The decomposable ammonium cations can be removed, at least in large part, by ion-exchange and replaced with metal cations, preferably by subjecting the ammonium form of the zeolite to a mild ion exchange treatment with an aqueous NaCl solution. The OH absorption bands produced by the thermal decomposition of ammonium cations are thereby avoided. Accordingly the absorption band over the range of 3745 cm$^{-1}$ to about 3000 cm$^{-1}$ for a zeolite so treated is almost entirely attributable to hydroxyl groups associated with defect structure and the absolute absorbance of this band can be a measure of the degree of aluminum depletion.

It is found, however, that the ion-exchange treatment, which must necessarily be exhaustive even though mild, required considerable time. Also the combination of the ion-exchange and the vacuum calcination to remove adsorbed water does not remove every possible hydroxyl other than defect hydroxyls which can exhibit absorption in the 3745 cm$^{-1}$ to 3000 cm$^{-1}$ range. For instance, a rather sharp band at 3745 cm$^{-1}$ has been attributed to the Si-OH groups situated in the terminal lattice positions of the zeolite crystals and to amorphous (non-zeolitic) silica from which physically adsorbed water has been removed. For these reasons we prefer to use a somewhat different criterion to measure the degree of defect structure in the zeolite products of this invention.

In the absence of hydrogen-bonded hydroxyl groups contributed by physically adsorbed water, the absorption frequency least affected by absorption due to hydroxyl groups other than those associated with framework vacancies or defect sites is at 3710±5 cm$^{-1}$. Thus the relative number of defect sites remaining in a zeolite product of this invention can be gauged by first removing any adsorbed water from the zeolite, determining the value of the absolute absorbance in its infrared spectrum at a frequency of 3710 cm$^{-1}$, and comparing that value with the corresponding value obtained from the spectrum of a zeolite having a known quantity of defect structure. The following specific procedure has been arbitrarily selected and used to measure the amount of defect structure in the products prepared in the Examples appearing hereinafter. Using the data obtained from this procedure it is possible, using simple mathematical calculation, to obtain a single and reproducible value hereinafter referred to as the "Defect Structure Factor", denoted hereinafter by the symbol "z", which can be used in comparing and distinguishing the present novel zeolite compositions from their less-siliceous prior known counter-parts and also with equally siliceous prior known counter-parts prepared by other techniques.

DEFECT STRUCTURE FACTOR (A) Defect Structure Zeolite Standard.

Standards with known amounts of defect structure can be prepared by treating a crystalline zeolite of the same species as the product sample with ethylenediaminetetraacetic acid by the standard procedure of Kerr as described in U.S. Pat. No. 3,442,795. In order to prepare the standard it is important that the starting zeolite be well crystallized, substantially pure and free from defect structure. The first two of these properties are readily determined by conventional X-ray analysis and the third by infrared analysis using the procedure set forth in part (B) hereof. The product of the aluminum extraction should also be well crystallized and substantially free from impurities. The amount of aluminum depletion, i.e., the mole fraction of tetrahedral defect structure of the standard samples can be ascertained by conventional chemical analytical procedure. The molar $SiO_2/Al_2O_3$ ratio of the starting zeolite used to prepare the standard sample in any given case is not narrowly critical, but is preferably within about 10% of the molar $SiO_2/Al_2O_3$ ratio of the same zeolite species used as the starting material in the practice of the process of the present invention.

(B) Infrared Spectrum of Product Samples and Defect Structure Zeolite Standard.

Fifteen milligrams of the hydrated zeolite to be analyzed are pressed into a 13 mm. diameter self-supporting wafer in a KBr die under 5000 lbs. pressure. The wafer is then heated at 200° C. for 1 hour at a pressure of not greater than $1\times10^{-4}$ mm. Hg to remove all observable traces of physically adsorbed water from the zeolite. This condition of the zeolite is evidenced by the total absence of an infrared adsorption band at 1640 cm$^{-1}$. Thereafter, and without contact with adsorbable substances, particularly water vapor, the infrared spectrum of the wafer is obtained on an interferometer system at 4 cm$^{-1}$ resolution over the frequency range of 3745 to 3000 cm$^{-1}$. Both the product sample and the standard sample are analyzed using the same interferometer system to avoid discrepancies in the analysis due to different apparatus. The spectrum, normally obtained in the transmission mode of operation is mathematically converted to and plotted as wave number vs. absorbance.

(C) Determination of the Defect Structure Factor.

The defect structure factor (z) is calculated by substituting the appropriate data into the following formula:

$$z + \frac{AA_{(ps)} \times \text{(Mole fraction of defects in the standard)}}{AA_{(std)}}$$

wherein $AA_{(ps)}$ is the infrared absolute absorbance measured above the estimated background of the product sample at 3710 cm$^{-1}$; $AA_{(std)}$ is the absolute absorbance measured above the background of the standard at 3710 cm$^{-1}$ and the mole fraction of defects in the standard are determined in accordance with part (A) above.

Once the defect structure factor, z, is known, it is possible to determine from wet chemical analysis of the product sample for $SiO_2$, $Al_2O_3$ and the cation content as $M_{2/n}/O$ whether silicon has been substituted for aluminum in the zeolite as a result of the treatment and also the efficiency of any such silicon substitution.

The fact that the present process results in zeolite products having silicon substituted for aluminum in the framework is substantiated by the framework infrared spectrum in addition to the hydroxyl region infrared spectrum. In the former, there is a shift to higher wave numbers of the indicative peaks and some sharpening thereof in the case of the present products, as compared to the starting zeolite, which is due to an increased $SiO_2/Al_2O_3$ molar ratio.

The essential X-ray powder diffraction patterns appearing in this specification and referred to in the appended claims are obtained using standard X-ray powder diffraction techniques. The radiation source is a high-intensity, copper target, x-ray tube operated at 50 Kv and 40 ma. The diffraction pattern from the copper K alpha radiation and graphite monochromator is suitably recorded by an X-ray spectrometer scintillation counter, pulse-height analyzer and strip-chart recorder. Flat compressed powder samples are scanned at 2° (2 theta) per minute, using a 2 second time constant. Interplanar spacings (d) are obtained from the position of the diffraction peaks expressed as 2 theta, where 2 theta is the Bragg angle as observed on the strip chart. Intensities are determined from the heights of diffraction peaks after subtracting background.

In determining the cation equivalency, i.e. the molar ratio $M_{2/n}O/Al_2O_3$ in each zeolite product, it is advantageous to perform the routine chemical analysis on a form of the zeolite in which "M" is a monovalent cation other than hydrogen. This avoids the uncertainty which can arise in the case of divalent or polyvalent metal zeolite cations as to whether the full valence of the cation is employed in balancing the net negative charge associated with each $AlO_4$-tetrahedron or whether some of the positive valence of the cation is used in bonding with $OH^-$ or $H_3O^+$ ions.

The preferred novel crystalline aluminosilicate compositions of the present invention will contain a chemical or molar framework composition which can be determined from the expression of mole fractions of framework tetrahedra previously described:

$$[Al_{(a-N)}Si_{b+(N-\Delta z)}\square_z]O_2$$

wherein: the framework Si/Al ratio is determined by $$\frac{b + (N - \Delta z)}{a - n}$$

and is numerically greater than 3; the mole fraction of silicon tetrahedra substituted into the framework of the product zeolite $(N-\Delta z)$ is increased by at least a value for $$\frac{(N - \Delta z)}{N}$$

which is numerically 0.5, the change in Defect Structure Factor $\Delta z$ is increased by less than 0.08 and preferably less than 0.05.

Moreover, regardless of the Defect Structure Factor of any zeolite material which has been treated according to the present process, it is novel by virtue of having had extraneous silicon inserted into its crystal lattice and having a molar $SiO_2/Al_2O_3$ ratio greater than heretofore obtained by direct hydrothermal synthesis. This is necessarily the case since all other methods for increasing the $SiO_2/Al_2O_3$ ratio of a zeolite crystal must remove framework aluminum atoms, and unless at least one of those removed aluminum atoms is replaced by a silicon atom from a source other than the crystal itself, the absolute defect structure content of the crystal must be greater than that of LZ-210.

ZEOLITE LZ-210-A

The catalysts of the instant invention are prepared by use of a zeolite prepared by the treatment of LZ-210 having a $SiO_2$ to $Al_2O_3$ ratio of greater than 6.0 and preferably, greater than 7.0 with Group IIIA cations.

LZ-210-A can be prepared by treating an LZ-210 material with an effective amount of at least one Group IIIA cation by treatment with a solution of a Group IIIA salt under effective ion-exchange conditions. The term "Group IIIA cation" is meant to denominate hydroxylated cations, complexed cations, solvated cations and the like. Such effective conditions will result in an average of at least one Group IIIA cation being provided to the LZ-210 material per every unit cell, preferably at least 2 per every unit cell and most preferably at least 3 per unit cell. Although the Group IIIA cation exchange conditions are not critical, typical exchange conditions would be to exchange the LZ-210 in an aqueous slurry of a water soluble Group IIIA salt at a temperature between about 20° C. and about 120° C. for a period greater than about 0.25 hour at atmospheric pressure. The Group IIIA salt can be most any salt which contains Group IIIA cations in solution, preferably aqueous solution, and it may be nitrates, chlorides, organic salts and the like. Preferably the salt is an aluminum salt. Although water is the preferred solvent for the Group IIIA salt it is within the scope of this invention to employ organic solvents, inorganic solvents, and mixtures of organic and inorganic solvents.

In addition to the Group IIIA cation exchange the LZ-210 material may be subject to further treatments including thermal treatment and ion-exchange with ammonium and/or multivalent cations other than Group IIIA cations.

The term "thermal treatment" is employed here to denominate both a thermal calcination and a hydrothermal calcination, i.e., calcination in the presence of steam. The thermal treatment is carried out at an effective temperature and time and when a hydrothermal treatment in the presence of an effective amount of steam, to provide an LZ-210-A based catalyst. The thermal treatment is typically carried out at a temperature in excess of 500° C. for a period in excess of 0.25 hours and when the thermal treatment is a hydrothermal treatment it is typically carried out in the presence of at least about 20 percent by volume steam. The source of the steam is not important and may be provided from an external source or may be generated in situ at the temperatures employed for the hydrothermal treatment.

LZ-210-A may also be subjected to ion-exchange or impregnation with ammonium and/or a multivalent cations other than Group IIIA cations by contacting LZ-210 or LZ-210-A with a solution containing ammonium and/or at least one multi-valent cation selected from the group consisting of cations of Group IIA and rare earth cations selected from the group consisting of lanthanum, cerium, praseodymium, neodymium, promethium, samarium, europium, gadolinium, terbium, dysprosium, holmium, erbium, thulium, yttribium, lutetium and mixtures thereof. As a result of ion-exchange of the LZ-210 or LZ-210-A, at least one cation is ion-exchanged with the cations initially present. The cation(s) is typically present in an amount that removes at least about 2 ion exchange percent of the cations (other than cations of Group IIIA) present in the starting LZ-210-A material and is preferably present in an amount greater than about 5.0 ion exchange percent and more preferably between about 16 ion exchange percent and about 80 ion exchange percent.

Catalysts are prepared using LZ-210-A derived from LZ-210 materials having a silica to alumina ratio of greater than 6, preferably greater than 7. As above noted, the preparation of LZ-210-A can involve several optional steps other than the Group IIIA cation exchange, including multivalent cation exchange (other than Group IIIA) and/or thermal treatment. The various processing steps employed in conjunction with LZ-210-A which may be employed to prepare a given catalyst (containing LZ-210-A) are denominated herein by a shorthand notation where the following notations have the following general meanings:

(i) LZ-210 has been exchanged with aluminum cations;

(ii) LZ-210 has been exchanged with a multivalent cation other than Group IIIA;

(iii) thermal treatment; and (iv) LZ-210 has been ion exchanged with ammonium cations.

The above steps can be employed in a sequential manner to set forth the processing sequences employed for a given catalyst and may be employed in any order for one or more times.

The Group IIIA ion exchange step, (i), can be carried out either before or after steps (ii), (iii), or (iv) but is in most cases carried out after any step (iv). The various ion-exchanges (Group IIIA, ammonium and/or the multivalent cation exchange) are generally carried out by preparing a slurry of the zeolite by adding about 5 to 15 volumes of water per volume of zeolite, after which a solution is added. The ion exchange is generally carried out at room temperature (18° C. to 22° C). The resulting solution may then heated to above about 50° C. and stirred at this temperature for about 0.5 to 3 hours. This mixture is then filtered and water washed to remove excess anion present as a result of the solution containing the cation.

The ammonium ion exchange step is preferably carried out by slurrying the zeolite with between 5 to 15 volumes of the ammonium-containing solution per volume of catalyst after which an ammonium salt is added to the slurry. The resulting mixture is typically heated to a temperature above about 50° C. for a period between about 0.5 to 3 hours. The mixture is filtered and water washed until excess anion from the ammonium salt is removed. The ammonium ion exchange process is typically repeated one or more times according to the above described procedure.

Catalyst LZ-210-A is typically employed with inorganic oxide matrix in an amount between about 1 percent and about 99 percent by weight and preferably between about 1 percent and about 90 percent by weight based on the total weight of matrix and zeolite. When a matrix is employed it may be admired with LZ-210 before or after steps (i) to (iv) are carried out, i.e., the matrix may be admixed with LZ-210 prior to step (i). The matrix may be inorganic matrices which are typically employed in FCC catalysts including: amorphous catalytic inorganic oxides, clays, silica, alumina, silica-alumina, silica-zirconia, silica-magnesia, alumina-boria, alumina-titania and the like and mixtures thereof. The matrix may be in the form of a sol, hydrogel or gel and is typically an alumina or amorphous silica-alumina component such as those employed in a formulating conventional silica-alumina cracking catalyst, several types and compositions of which are commercially available. The matrix may itself provide a catalytic effect or it may be essentially inert. The matrix may act as a "binder" in some instances. The final catalyst will be spray dried or formed without the need of a binder. These materials may be prepared as a cogel of silica and/or alumina or may be precipitated on a preformed and preaged hydrogel. Silica may be present as a major component in the solids present in said gels, e.g. present in an amount between about 55 and about 99 weight percent and preferably between about 70 and about 90 weight percent. The silica may also be employed in the form of a cogel comprising about 75 weight percent silica and about 25 weight percent alumina or comprising about 87 weight percent silica and about 13 weight percent alumina. The inorganic oxide matrix component will typically be present in the catalyst in an amount between about 20 and about 99 weight percent, preferably between about 50 and about 90 weight percent, based on the total catalyst. It is also within the scope of the instant invention to employ other materials with the LZ-210-A in the final cracking catalysts, including various other types of molecular sieves, zeolites, clays, carbon monoxide oxidation promoters, etc.

Mixtures of LZ-210-A, alumina, silica, silica-alumina and/or another inorganic matrix are typically formed into a final form for the catalyst by standard catalyst forming techniques including spray-drying, pelleting, extrusion and other suitable means. For example, one inch extruded pellets may be dried in air at about 110° C. and then calcined.

Catalytic cracking catalysts of the present invention may be prepared by any one of the above mentioned several methods of extrusion, pelleting, spray-drying and other conventional methods. One method of preparing such catalysts employing silica-alumina and porous alumina is to react sodium silicate with a solution of aluminum sulfate to form a silica/alumina hydrogel slurry which is then aged to give the desired pore properties, filtered to remove a considerable amount of the extraneous and undesired sodium and sulfate ions and then reslurried in water. The alumina may be prepared by reacting solutions of sodium aluminate and aluminum sulfate under suitable conditions, aging the slurry to give the desired pore properties of the alumina, filtering drying, reslurry in water to remove sodium and sulfate ions and drying to reduce volatile matter content to less than 15 weight percent. The alumina may then be slurried in water and blended in proper amounts, with a slurry of silica-alumina hydrogel. The LZ-210-A component may then be added to this blend. A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent. The catalyst is typically recovered after calcination.

Catalytic cracking with the catalyst of the present invention can be conducted in any conventional catalytic cracking manner. Suitable catalytic cracking conditions include a temperature ranging from about 700° F. to about 1300° F. and a pressure ranging from about subatmospheric to several atmospheres, typically from about atmospheric to about 100 psig. The process may be carried out in a fixed bed, moving bed, ebullating bed, slurry, transferline, or fluidized bed operation. The catalyst of the present invention can be used to convert any of the conventional hydrocarbon feeds used in catalytic cracking, that is, it can be used to crack naphthas, gas oil and residual oils having a high content of metal contaminants. It is especially suited for cracking hydrocarbons boiling in the gas oil range, that is, hydrocarbon oils having an atmospheric pressure boiling point ranging from about 420° to about 1100° F. to naphthas to yield not only products having a lower boiling point than the initial feed but also products having an improved octane number.

In addition, catalysts LZ-210-A derived are believed to be useful in an FCC (fluid catalytic cracking) process wherein a carbon-hydrogen fragmentation compound (CHFC) employed in admixture with the crude oil feed. Such a process will be referred to herein as an FCC-CHFC process.

The term "carbon-hydrogen fragmentation compound(s)" is employed herein to mean materials comprising a lesser number of carbon atoms than found in materials within the gasoline boiling range, preferably those materials containing 5 or less carbon atoms, that fit into any of the categories of:

(a) Hydrogen-rich molecules, i.e. molecules with wt. % hydrogen ranging from about 13.0–25.0 wt. %. This may include light paraffins, i.e. $CH_4$, $C_2H_6$, $C_3H_8$ and other materials.

(b) i.e. a molecule whose chemical structure permits or favors the transfer of carbon-hydrogen fragments. This includes $CH_3OH$, other low boiling alcohols such as ethanol, n-propanol, isopropanol, n-butanol, isobutanol, etc., aliphatic ethers, e.g., dimethyl ether, and other oxygen compounds (acetals, aldehydes, ketones).

(c) Secondary Reaction Products from materials in categories (a) or (b) above that are carbon-hydrogen fragmentation compounds themselves, or transfer hydrogen. This includes olefins, napthenes, or paraffins.

(d) Classes of materials which are structurally or chemically equivalent to those of category (c), noteably olefins, etc.; and (e) A combination of any or all of the materials in categories (a) through (d). The preferred carbon-hydrogen fragmentation compounds are methanol, dimethyl ether and $C_2$–$C_5$ olefins, with methanol and dimethyl ether being the most preferred.

The terms "crude oil feed" is used herein to denominate any full range crude oil from primary, secondary or tertiary recovery from conventional or offshore oil fields. "Crude oil feeds" may include any full range "syncrude" such as those that can be derived from coal, shale oil, tar sands and bitumens. The crude may be virgin (straight run) or generated synthetically by blending. It is generally desirable, however, to first desalt the crude since sodium, generally in the form of sodium chloride, is known to be a poison for most cracking operations. Surprisingly, it has been found that LZ-210-A has an especially high tolerance for sodium as compared with Zeolite Y or LZ-210. Further the term crude oil feed is meant to include component parts of the crude which are generally employed as catalytic cracking feeds or potential feeds therefor and include feeds such as distillate gas oils, heavy vacuum gas oils, atmospheric and vacuum resids, syncrudes (from shale oil, tar sands, coal), pulverized coal and fractions boiling above the traditional end of the gasoline boiling range which generally includes compounds containing greater than about eleven carbon atoms and combinations thereof.

Further, the FCC-CHFC process is believed to involve combination reactions which are believed to be effective, at least in part, in removing sulfur, oxygen, nitrogen and metal contaminants found in a whole crude or a heavy hydrocarbon portion thereof.

The operation of an FCC-CHFC type process is generally carried out at temperatures within the range of 400° F. up to about 1400° F. and more usually within the range of 700° F. to about 1200° F. at pressures selected from within the range of below atmospheric up to several hundred pounds but normally less than 100 psig. Preferred conditions include a temperature within the range of about 800° F. to about 1150° F. and pressures within the range of atmospheric to about 200 psig and higher.

The carbon-hydrogen fragmentation compound may be provided to the process in most any way so long as it is present when contact with the catalyst material is effected, i.e. in situ generation is suitable.

In the preferred operation an FCC-CHFC process methanol is used in combination with a gas oil type of hydrocarbon charge stock. The weight percent of methanol in the hydrocarbon charge passed to the cracking or conversion operation will vary considerably and may be selected from within the range of between about 1% and about 25 percent by weight, it being preferred to maintain the ratio within the range between about 5% and about 20, based on the weight of the feed. However, this may vary depending upon the hydrogen deficiency of the high molecular weight hydrocarbon charge, the amount of sulfur, nitrogen and oxygen in the oil charge, the amount of polycyclic aromatics, the type of catalyst employed, and the level of conversion desired. It is preferred to avoid providing any considerable or significant excess of methanol with the charge because of its tendency to react with itself under some conditions.

The FCC-CHFC process preferably employs a fluidized catalyst system at low pressures without the need for high pressure hydrogen gas. Such a system promotes the highly efficient contact of relatively inexpensive carbon-hydrogen fragmentation compounds with heavy, refractory molecules in the presence of high-surface area cracking catalyst. Intermolecular hydrogen-transfer interactions, e.g., methylating reactions, and catalytic cracking reactions are effected in the presence of fluidized catalyst particles and act to minimize problems due to diffusion/mass transport limitations and/or heat transfer.

The FCC-CHFC process can make use of the relatively cheap carbon-hydrogen fragmentation compounds readily available in petroleum refineries, such as light gas fractions, light olefins, low boiling liquid streams, etc., and, in particular, can employ methanol, a product which is readily available in quantity, either as a transportable product from overseas natural gas conversion processes, or as a product from large scale coal, shale, or tar sand gasification. It also can utilize carbon monoxide (in combination with contributiors such as water or methanol), which gas is readily available from refinery regeneration flue gas (or other incomplete combustion processes), or from coal, shale, or tar sand gasification. Highly efficient recycle of carbon-hydrogen fragmentation compounds can also be effected.

The following examples were carried out to illustrate the instant invention and are not intended to be limiting thereof. The experimental procedure employed was described in copending U.S. Ser. No. 315,853.

COMPARATIVE EXAMPLES 1 TO 4

The catalysts of examples 1 to 4 were prepared using commercially available Y-zeolites (referred to herein as Reference Zeolites A and B) having $SiO_2$ to $Al_2O_3$ ratios of 5.1 (examples 1 and 2) and 4.9 (examples 3 and 4), respectively. Zeolite B was twice ammonium exchanged prior to the aluminum exchange so as to lower the $Na_2O$ content.

Examples 2 and 4 were carried out by slurrying 100 grams of Reference Zeolites A or B, respectively, in 1 liter of 0.1M aluminum nitrate ($Al(NO_3)_3.9H_2O$) for two hours at ambient temperature (18° C. to 24° C.). The product was filtered, washed with distilled water and dried in air at 100° C.

The results of the measurement of the physical and chemical properties of the zeolites are set forth in Table I. For comparison purposes examples 1 and 3 (non-aluminum exchanged) should be compared with examples 2 and 4 (aluminum exchanged), respectively.

With respect to Table I and all Tables set forth hereinafter in the examples the footnotes 1, 2, 3 and 4 are employed to mean the following:

TABLE I

|  | Example | | | |
|---|---|---|---|---|
|  | 1 | 2 | 3 | 4 |
| Initial SiO$_2$/Al$_2$O$_3$ | 5.1 | 5.1 | 4.9 | 4.9 |
| Exchange Ion | None | Al$^{+3}$ | None | Al$^{+3}$ |
| Chemical Analysis: | | | | |
| % Exchanged Al$_2$O$_3^{(1)}$ | 0 | 3.9 | 0 | 3.2 |
| % Na$_2$O | 2.25 | 2.07 | 1.09 | 1.03 |
| % (NH$_4$)$_2$O | 9.5 | 4.5 | 10.0 | 5.3 |
| % Al$_2$O$_3$ (Framework)$^{(2)}$ | 22.0 | 21.9 | 22.5 | 22.7 |
| % SiO$_2$ | 65.4 | 65.2 | 65.4 | 65.9 |
| Infrared Analysis: | | | | |
| Assymetric Framework Stretch (cm.$^{-1}$) | — | 1020 | 1018 | 1020 |
| Symmetric Framework Stretch (cm.$^{-1}$) | — | 786 | 784 | 785 |
| Hydroxyl Intensity at 500° C. | — | 0.375 | 2.21 | .357 |
| Physical Analysis: | | | | |
| XRD Peak Area$^{(3)}$ | 100 | 83.7 | 100 | 79.2 |
| Unit Cell Constant | 24.73 | 24.69 | 24.73 | 24.82 |
| O$_2$ Capacity | 34.1 | 29.4 | 35.3 | 29.4 |
| Surface Area | 876 | 745 | 918 | 718 |
| DTA Collapse T, °C. | 884 | 946 | 852 | 910 |

$^{(1)}$% Exchanged Alumina =

$$\% \text{Al}_2\text{O}_{3 FINAL} - \left( \left( \frac{\text{Al}_2\text{O}_3}{\text{SiO}_2} \right)_{INITIAL} \times \% \text{SiO}_{2 FINAL} \right)$$

$^{(2)}$% Al$_2$O$_3$ (framework) = % Al$_2$O$_{3 FINAL}$ − % Exchanged Alumina
$^{(3)}$Relative to unexchanged LZ-210 or Y zeolite.
$^{(4)}$DTA = Differential Thermal Analysis.

COMPARATIVE EXAMPLES 5 TO 8

The zeolites prepared in examples 1 to 4 were evaluated in examples 5 to 8, respectively for hydrothermal stability by measuring the percent crystal retention after each zeolite was subjected to a hydrothermal treatment. The hydrothermal treatment was carried out in a horizontal tube furnace fitted with a Vycor furnace tube connected to a steam generator set to produce 23%±2 steam in air at a flow-rate of 2.5 cubic feet per hour. The "hot zone" of the furnace was preheated in the gas flow to 873° C.±4 before the zeolite samples were introduced to the furnace. The zeolite was introduced into the furnace by placing about 2 grams of the hydrated sample into a shallow 3-inch long ceramic boat and then thrust into the hot zone of the furnace. In each case the sample boats were tied together and each experiment contained a reference catalyst which was an ammonium exchanged steam stabilized Y-zeolite. After a heating period of five (5) hours in 23%±2 steam the furnace was opened and the hot catalysts removed. The catalysts were hydrated at room temperature in a water containing chamber for at least 48 hours. The catalysts were analyzed to determine their O$_2$ capacity, surface area and XRD peak area before and after the hydrothermal treatment. The results of these measurements are both shown in Table II. The data show that both the starting Y and ammonium-exchange Y are adversely affected, i.e., degraded, by the hydrothermal treatment and retain an average of only 2.9 and 4.1% crystallinity, respectively. The results also show that aluminum cation exchange does nothing to improve the hydrothermal stability of the Y zeolite. In fact, after aluminum exchange and hydrothermal stability of the Y zeolites decreased (based on the crystallinity retention) to 0 and 1.7%, respectively.

EXAMPLES 9 TO 30

LZ-210 and LZ-210-A zeolites were prepared according to the procedure of U.S. Ser. No. 315,853 using as the starting material a zeolite Y having a SiO$_2$ to Al$_2$O$_3$ ratio of about 5. The SiO$_2$ to Al$_2$O$_3$ ratios of the resulting LZ-210 and LZ-210-A compositions are shown in Table III. The zeolites of examples 11, 12, 16, 17 and 18 were ammonium exchanged to lower the Na$_2$O content. The aluminum exchange was carried out as shown in the examples by a procedure similar to that employed in Examples 1 to 4.

Table III shows that the thermal stability of LZ-210-A is general better than that observed for LZ-210 which has not been exchanged with an aluminum cation. The improved thermal stability of LZ-210-A is readily observable from the DTA Collapse temperature which shows that LZ-210-A has a generally higher DTA Collapse temperature. Table III provides comparisons between LZ-210 and aluminum exchanged LZ-210 by comparing the examples as follows: 9 with 10; 11 with 12, 13 with 14 and 15; 16 with 17 and 18; 19 with 20 and 21; 22 with 23 and 24; 25 with 26 and 27; and 28 with 29 and 30.

TABLE II

|  | Example | | | |
|---|---|---|---|---|
|  | 5 | 6 | 7 | 8 |
| Initial SiO$_2$/Al$_2$O$_3$ | 5.1 | 5.1 | 4.9 | 4.9 |
| Exchange Ion | None | Al$^{+3}$ | None | Al$^{+3}$ |
| % Al$_2$O$_3$ Exchange$^{(1)}$ | 0 | 3.9 | 0 | 3.2 |
| % Na$_2$O | 2.25 | 2.07 | 1.09 | 1.03 |
| Crystal Retention* | | | | |
| % O$_2$ Capacity Retention | 7.6 | 0.0 | 4.9 | 2.9 |
| % Surface Area Retention | 1.0 | 0.0 | 3.3 | 2.1 |
| % XRD Peak Area Retention | 0.0 | 0.0 | 4.0 | 0.0 |
| Average % Retention | 2.9 | 0.0 | 4.1 | 1.7 |

$^{(1)}$% Exchanged Al$_2$O$_3$ =

$$\% \text{Al}_2\text{O}_{3 FINAL} - \left( \left( \frac{\text{Al}_2\text{O}_3}{\text{SiO}_2} \right)_{INITIAL} \times \% \text{SiO}_{2 FINAL} \right)$$

*After steaming at 870° C., 23° C. steam.

TABLE III

| Example: | 9 | 10 | 11 | 12 | 13 | 14 | 15 | 16 | 17 | 18 | 19 |
|---|---|---|---|---|---|---|---|---|---|---|---|
| Initial SiO$_2$/Al$_2$O$_3$ | 6.5 | 6.5 | 6.5 | 6.5 | 7.4 | 7.4 | 7.4 | 8.4 | 8.4 | 8.4 | 8.4 |
| Exchange Ion | None | Al$^{+3}$ | None | Al$^{+3}$ | None | Al$^{+3}$ | Al$^{+3}$ | None | Al$^{+3}$ | Al$^{+3}$ | None |
| Chemical Analysis: | | | | | | | | | | | |
| % Exchanged Al$_2$O$_3^{(1)}$ | 0 | 3.2 | 0 | 3.3 | 0 | 2.6 | 2.7 | 0 | 2.6 | 2.8 | 0 |
| % Na$_2$O | 2.3 | 2.0 | — | 0.42 | 1.28 | 1.5 | 1.3 | 0.05 | 0.07 | 0.12 | 1.13 |
| % (NH$_4$)$_2$O | 6.8 | 2.7 | 8.6 | 4.4 | 6.3 | 3.2 | 2.9 | 7.6 | 4.0 | 3.7 | 6.1 |
| % Al$_2$O$_3$ (Framework)$^{(2)}$ | 18.9 | 18.8 | 18.7 | 18.7 | 17.1 | 17.1 | 17.0 | 15.3 | 15.6 | 15.5 | 15.7 |
| % SiO$_2$ | 71.9 | 71.4 | 71.0 | 71.0 | 74.9 | 74.7 | 74.5 | 75.3 | 76.7 | 76.4 | 77.3 |
| DTA Collapse T, °C. | 973 | 1002 | 940 | 978 | 1016 | 1050 | 1046 | 1031 | 1061 | 1058 | 1058 |

TABLE III-continued

| Example: | 20 | 21 | 22 | 23 | 24 | 25 | 26 | 27 | 28 | 29 | 30 |
|---|---|---|---|---|---|---|---|---|---|---|---|
| Initial $SiO_2/Al_2O_3$: | 8.4 | 8.4 | 9.0 | 9.0 | 9.0 | 9.1 | 9.1 | 9.1 | 11.0 | 11.0 | 11.0 |
| Exchange Ion: | $Al^{+3}$ | $Al^{+3}$ | None | $Al^{+3}$ | $Al^{+3}$ | None | $Al^{+3}$ | $Al^{+3}$ | None | $Al^{+3}$ | $Al^{+3}$ |
| Chemical Analysis: | | | | | | | | | | | |
| % Exchanged $Al_2O_3$[1] | 2.7 | 3.0 | 0 | 2.3 | 2.2 | 0 | 3.7 | 3.0 | 0 | 3.3 | 3.3 |
| % $Na_2O$ | 0.95 | 0.79 | 1.28 | 0.93 | 1.01 | 1.2 | 0.85 | 0.83 | 0.39 | 0.44 | 0.45 |
| % $(NH_4)_2O$ | 3.0 | 2.6 | 6.1 | 2.5 | 2.7 | 6.2 | 2.9 | 3.2 | 5.1 | 2.2 | 1.6 |
| % $Al_2O_3$ (Framework)[2] | 15.7 | 15.7 | 14.5 | 15.0 | 15.0 | 14.3 | 14.2 | 14.5 | 12.3 | 12.3 | 12.7 |
| % $SiO_2$ | 77.5 | 77.5 | 77.0 | 79.5 | 79.2 | 76.4 | 76.0 | 77.3 | 79.5 | 79.2 | 82.2 |
| DTA[4] Collapse T, °C. | — | 1067 | 1061 | 1067 | 1067 | 1064 | 1082 | 1067 | 1110 | 1108 | — |

EXAMPLES 31 TO 52

The zeolites set forth in examples 9 to 30 were evaluated, respectively, in examples 31 to 52 for their hydrothermal stability by the procedure employed for examples 5 to 8. The results are shown in Table IV. The data show that aluminum exchange of LZ-210 increases the hydrothermal stability of the LZ-210 composition. This is opposite the result observed for zeolite Y as shown in Examples 5 to 8. There were only two cases (example 38 having a low $Na_2O$ content (0.05%) and example 31 having a low $SiO_2/Al_2O_3$ ratio (6.5) with high $Na_2O$ content (2.3%)) where the hydrothermal stability was not improved by aluminum exchanged. Although the reason for these two results are not understood it is believed that by proper correlation of the $SiO_2/Al_2O_3$ ratio and the $Na_2O$ content that improvement in the hydrothermal stability may be observed.

The data in Table IV provide comparisons between LZ-210 and LZ-210-A (aluminum exchanged LZ-210) by comparing the examples as follows: 31 with 32; 33 with 34, 35 with 36 and 37; 38 and 39 and 40; 41 with 42 and 43; 44 and 45 and 46; 47 and 48 and 49; 50 and 51 and 52.

EXAMPLES 53 TO 76

The effect of aluminum exchange on the hydrothermal stability of LZ-210 as compared with rare earth cation exchange was determined by rare-earth exchanging several LZ-210 compositions. The patent literature has reported that Y zeolites do show a slight improvement in hydrothermal stability upon rare earth ion exchange. The LZ-210 compositions of examples 54, 56, 58, 60 and 63 were rare earth exchanged to form the compositions of 55, 57, 59, 61, 62 and (64 and 65), respectively, using a mixture (solution) of rare earth chlorides (Molycorp's Product No. 5240) having a rare earth analysis of:

| | Wt. % |
|---|---|
| Ce | 2.8 |
| La | 14.7 |
| Nd | 4.5 |
| Pr | 3.3 |

The rare earth exchange was carried out using a 1 hour reflux. The results are shown in Table V. The data show that rare-earth exchange gave an increase in the DTA collapse temperature indicating an increase in the thermal stability.

The hydrothermal stability of these catalysts were evaluated by the procedure employed in Examples 5 to 8. The results are reported in Table VI. The data show that no significant improvement in hydrothermal stability was observed by the rare earth exchange whereas aluminum exchange did provide a significant improvement in hydrothermal stability.

TABLE IV

| Example: | 31 | 32 | 33 | 34 | 35 | 36 | 37 | 38 | 39 | 40 | 41 |
|---|---|---|---|---|---|---|---|---|---|---|---|
| Initial $SiO_2/Al_2O_3$ | 6.5 | 6.5 | 6.5 | 6.5 | 7.4 | 7.4 | 7.4 | 8.4 | 8.4 | 8.4 | 8.4 |
| Exchange Ion | None | $Al^{+3}$ | None | $Al^{+3}$ | None | $Al^{+3}$ | $Al^{+3}$ | None | $Al^{+3}$ | $Al^{+3}$ | None |
| Chemical Analysis: | | | | | | | | | | | |
| % Exchanged $Al_2O_3$[1] | 0 | 3.2 | 0 | 3.3 | 0 | 2.6 | 2.7 | 0 | 2.6 | 2.8 | 0 |
| % $Na_2O$ | 2.3 | 2.0 | 0.38 | 0.42 | 1.28 | 1.5 | 1.3 | 0.05 | 0.07 | 0.12 | 1.13 |
| Crystal Retention* | | | | | | | | | | | |
| % $O_2$ Capacity Retention | 2.7 | 1.7 | 55.8 | 58.0 | 5.8 | 50.1 | 40.9 | 72.5 | 76.6 | 74.6 | 47.9 |
| % Surface Area Retention | 0.5 | 0.4 | 55.4 | 75.6 | 3.7 | — | 40.2 | 71.8 | 76.1 | 74.7 | 46.6 |
| % XRD Peak Retention | 0.0 | 0.0 | 42.5 | 62.6 | 0.0 | 59.6 | 38.8 | 85.0 | 85.6 | 85.3 | 57.9 |
| Average % Retention | 1.1 | 0.7 | 50.9 | 65.4 | 3.2 | 54.9 | 40.0 | 76.7 | 79.4 | 78.2 | 50.8 |

| Example: | 42 | 43 | 44 | 45 | 46 | 47 | 48 | 59 | 50 | 51 | 52 |
|---|---|---|---|---|---|---|---|---|---|---|---|
| Initial $SiO_2/Al_2O_3$ | 8.4 | 8.4 | 9.0 | 9.0 | 9.0 | 9.1 | 9.1 | 9.1 | 11.0 | 11.0 | 11.0 |
| Exchange Ion | $Al^{+3}$ | $Al^{+3}$ | None | $Al^{+3}$ | $Al^{+3}$ | None | $Al^{+3}$ | $Al^{+3}$ | None | $Al^{+3}$ | $Al^{+3}$ |
| Chemical Analysis: | | | | | | | | | | | |
| % Exchanged $Al_2O_3$[1] | 2.7 | 3.0 | 0 | 2.3 | 2.2 | 0 | 3.7 | 3.0 | 0 | 3.3 | 3.3 |
| % $Na_2O$ | 0.95 | 0.79 | 1.28 | 0.93 | 1.01 | 1.2 | 0.85 | 0.83 | 0.39 | 0.44 | 0.45 |
| Crystal Retention* | | | | | | | | | | | |
| % $O_2$ Capacity Retention | 72.1 | 60.0 | 20.5 | 62.4 | 50.5 | 33.6 | 68.4 | 57.0 | 70.3 | 74.8 | 77.4 |
| % Surface Area Retention | 80.3 | 62.0 | 33.3 | 54.0 | 54.4 | 31.0 | 64.7 | — | 71.5 | 69.5 | — |
| % XRD Peak Retention | — | 92.0 | 41.2 | 74.2 | 76.8 | 41.8 | 79.8 | 72.3 | 70.0 | 90.0 | — |
| Average % Retention | 76.2 | 71.3 | 34.3 | 63.5 | 60.6 | 35.5 | 71.0 | 64.6 | 70.6 | 78.1 | 77.4 |

*After destructive steaming at 870° C., 23° C. steam.

TABLE V

| Example: | 53 | 54 | 55 | 56 | 57 | 58 | 59 | 60 | 61 | 62 | 63 | 64 |
|---|---|---|---|---|---|---|---|---|---|---|---|---|
| Initial $SiO_2/Al_2O_3$ | 7.5 | 7.5 | 7.9 | 7.9 | 8.3 | 8.3 | 9.1 | 9.1 | 9.1 | 11.0 | 11.0 | 11.0 |

TABLE V-continued

| Example: | 53 | 54 | 55 | 56 | 57 | 58 | 59 | 60 | 61 | 62 | 63 | 64 |
|---|---|---|---|---|---|---|---|---|---|---|---|---|
| Exchange Ion | None | RE$_2$O$_3$ | None | RE$_2$O$_3$ | None | RE$_2$O$_3$ | None | RE$_2$O$_3$ | RE$_2$O$_3$ | None | RE$_2$O$_3$ | RE$_2$O$_3$ |
| Chemical Analysis: | | | | | | | | | | | | |
| % RE$_2$O | 0 | 5.77 | 0 | 6.19 | 0 | 5.58 | 0 | 6.15 | 2.27 | 0 | 5.8 | 5.7 |
| % Na$_2$O | 1.28 | 1.19 | 0.26 | 0.27 | 1.13 | 0.95 | 1.2 | 1.07 | 1.22 | 0.39 | 0.31 | 0.40 |
| % (NH$_4$)$_2$O | 6.3 | 3.8 | 7.23 | 4.92 | 6.1 | 3.64 | 6.2 | 3.75 | 5.26 | 5.1 | 2.6 | 2.6 |
| % Al$_2$O$_3$ | 17.1 | 16.5 | 16.58 | 16.04 | 15.7 | 15.3 | 14.3 | 14.7 | 15.4 | 12.3 | 11.7 | 12.5 |
| % SiO$_2$ | 74.9 | 72.5 | 76.65 | 71.97 | 77.3 | 74.8 | 76.4 | 76.7 | 79.5 | 79.5 | 78.8 | 78.7 |
| Cation/Aluminum | .85 | .90 | .88 | .99 | .88 | .91 | .99 | 1.01 | .94 | .87 | .94 | .89 |
| % RE Exchange | — | 32.6 | — | 36.0 | — | 34.0 | — | 39.0 | 13.8 | — | 46.2 | 42.5 |
| Physical Analysis: | | | | | | | | | | | | |
| XRD Peak Area* | 100 | 66.2 | 100 | 56.4 | 100 | 63.1 | 100 | 67.9 | 87.3 | 100 | 65.8 | 63.6 |
| Unit Cell Constant | 24.56 | 24.60 | 24.6 | 24.57 | 24.53 | 24.55 | 24.51 | 24.56 | 24.53 | 24.46 | 24.52 | 24.48 |
| O$_2$ Capacity | 31.2 | 33.2 | 34.7 | 31.2 | 31.5 | 29.8 | 33.7 | 32.4 | 31.6 | 31.0 | 30.5 | 30.1 |
| Surface Area | 890 | 731 | 927 | 866 | 814 | 596 | 855 | 861 | 831 | 840 | 830 | 705 |
| DTA Collapse T, °C. | 1016 | 1083 | 998 | 1079 | 1058 | — | 1064 | 1099 | 1097 | 1110 | 1131 | — |

*Relative to unexchanged LZ-210, expressed as a percentage.

TABLE VI

| Example: | 65 | 66 | 67 | 68 | 69 | 70 | 71 | 72 | 73 | 74 | 75 | 76 |
|---|---|---|---|---|---|---|---|---|---|---|---|---|
| Initial SiO$_2$/Al$_2$O$_3$ | 7.5 | 7.5 | 7.9 | 7.9 | 8.3 | 8.3 | 9.1 | 9.1 | 9.1 | 11.0 | 11.0 | 11.0 |
| Exchange Ion | None | RE$_2$O$_3$ | None | RE$_2$O$_3$ | None | RE$_2$O$_3$ | None | RE$_2$O$_3$ | RE$_2$O$_3$ | None | RE$_2$O$_3$ | RE$_2$O$_3$ |
| % RE Exchanged | — | 32.6 | — | 36.0 | — | 34.0 | — | 39.0 | 13.8 | — | 46.2 | 42.5 |
| % Na$_2$O | 1.28 | 1.19 | 0.26 | 0.27 | 1.13 | 0.95 | 1.2 | 1.07 | 1.22 | 0.39 | 0.31 | 0.40 |
| Crystal Retention*: | | | | | | | | | | | | |
| % O$_2$ Capacity Retention | 5.8 | 4.5 | 66.8 | 60.1 | 47.9 | 42.6 | 33.6 | 4.3 | 14.3 | 70.3 | 60.9 | 58.6 |
| % Surface Area Retention | 3.7 | 5.8 | — | 60.9 | 46.6 | 58.9 | 31.0 | 6.6 | 13.6 | 71.5 | 61.3 | 72.6 |
| % XRD Peak Area Retention | 0.0 | 22.8 | 61.3 | 77.4 | 57.9 | — | 41.8 | 47.0 | 24.9 | 70.0 | 79.8 | — |
| Average % Retention | 3.2 | 10.9 | 64.1 | 66.1 | 50.8 | 50.7 | 35.5 | 19.3 | 17.6 | 70.6 | 67.3 | 65.6 |

*After destructive steaming at 870° C., 23% Steam.

EXAMPLES 77 TO 90

Examples 77 to 90 are examples employing LZ-210 and LZ-210-A compositions as cracking catalysts. In each case LZ-210 and the LZ-210-A derived therefrom were evaluated as cracking catalysts. The LZ-210 or LZ-210-A was formulated into a cracking catalyst by mixing 15% zeolite (LZ-210 or LZ-210-A) with 85% alumina (anhydrous basis), based on the total catalyst weight. The catalysts were prepared by mixing the zeolite with alumina (65% based on the final total) in a Hobart mixer. Then a boehmite alumina (20%, based on the final total) was added and the composite extruded into 1/16" extrudates. The extrudates were dried at 100° C. The dried extrudates were then calcined in dry air at 500° C. and then treated at 840° C. in 23% steam for 17 hours. The latter treatment comprised heating the extrudates to 750° C. in static air from 500° C. at the rate of 12 to 16° C. per minute followed by introduction of the air/steam mixture and heating to 840° C. and heating at 840° C. for 17 hours.

The catalysts were sized to 60/100 mesh (U.S. Standard) and then evaluated by ASTM D-3907 for use as cracking catalysts. The results are shown in Table VII.

The data show that the aluminum exchange not only enhances hydrothermal stability but also may in some instance improve activity and selectivity to the gasoline fraction.

TABLE VII

| | Example | | | | | | | | | | | | | |
|---|---|---|---|---|---|---|---|---|---|---|---|---|---|---|
| | 77 | 78 | 79 | 80 | 81 | 82 | 83 | 84 | 85 | 86 | 87 | 88 | 89 | 90 |
| Initial SiO$_2$/Al$_2$O$_3$ | 6.5 | 6.5 | 7.4 | 7.4 | 8.3 | 8.3 | 9.0 | 9.0 | 9.1 | 9.1 | 11.0 | 11.0 | 11.0 | 11.0 |
| Exchange Ion | None | Al$^{+3}$ | None | Al$^{+3}$ | None | Al$^{+3}$ | None | Al$^{+3}$ | None | Al$^{+3}$ | None | Al$^{+3}$ | None | Al$^{+3}$ |
| MAT Conversion[1] | 51.0 | 39.0 | 72.5 | 73.6 | 72.4 | 71.6 | 70.2 | 65.3 | 66.3 | 69.3 | 71.3 | 73.7 | 66.9 | 68.4 |
| MAT Selectivity at 70% Conversion[2] | (3) | (3) | | | | | | | | | | | | |
| % Gasoline | (3) | (3) | 50.0 | 51.6 | 50.4 | 50.2 | 54.5 | 54.2 | 52.5 | 53.4 | 49.2 | 52.4 | 54.8 | 53.9 |
| % Gas | (3) | (3) | 15.9 | 13.9 | 15.0 | 13.9 | 11.6 | 11.6 | 13.0 | 12.6 | 16.6 | 13.8 | 10.8 | 11.8 |
| % Coke | (3) | (3) | 4.4 | 4.8 | 4.9 | 6.3 | 4.2 | 4.6 | 5.0 | 4.3 | 4.2 | 4.0 | 4.8 | 4.5 |

[1]Average of triplicate MAT runs. (ASTM D-3907).

[2]Yield @ 70% = $\frac{\text{Yield observed}}{\text{Conversion, observed}} \times 70.0\%$

[3]Conversion too low to predict selectivity.

We claim:

1. The zeolitic aluminosilicate having a mole ratio of oxide in the dehydrated state of:

$$0.85\text{-}1.1\ M_{2/n}O:Al_2O_3:XSiO_2$$

wherein M is a cation having valence "n"; "X" has a value greater than 6.0, has an X-ray powder diffraction pattern having at least the d-spacings of Table A; has extraneous silicon atoms in he crystal lattice in the form of framework SiO$_4$ tetrahedra; and has at least one Group IIIA cation per unit cell.

2. The zeolitic aluminosilicate of claim 1 having at least two Group III cations per unit cell.

3. The zeolitic aluminosilicate of claim 2 having at least three Group IIIA cations per unit cell.

4. The zeolitic aluminosilicate of claim 1 wherein the Group IIIA cation is aluminum.

5. The zeolitic aluminosilicate of claim 1 wherein "x" has a value greater than 7.0.

6. A catalyst for cracking hydrocarbons comprising between about 1 percent and about 99 percent by weight of an inorganic matrix and about 1 percent and about 99 percent by weight of the zeolitic aluminosilicate of claim 1.

7. The zeolitic aluminosilicate according to claim 1 wherein the aluminosilicate contains an effective amount of at least one multivalent cation selected from the group consisting of cerium, lanthanum, praseodymium, neodymium, promethium, samarium, europium, galodinium, terbium, dysprosium, holmium, erbium, thulium, ytterbium, lutetium and mixtures thereof.

8. The zeolitic aluminosilicate of claim 1 wherein the zeolitic aluminosilicate is defined as having a chemical composition expressed in terms of mole fractions of framework tetrahedra as:

$$[Al_{(a-N)}Si_{b+(N-\Delta z)}\square_z]O_2$$

wherein: "$\square$" denotes the defect sites; "z" is the mole fraction of defect sites in the zeolite framework; "N" is the mole fraction of aluminum tetrahedra removed from the framework; "a" is the mole fraction of aluminum tetrahedra present in the framework of the starting zeolite; "b" is the mole fraction of the silicon tetrahedra present in the framewok of the starting zeolite; "$(N-\Delta z)$" is the mole fraction increse in silicon tetrahedra; "$\Delta z$" is the net change in the mole fraction of defect sites;

$$\frac{b + (N - \Delta z)}{(a - N)}$$

has a value greater than 3; the change in defect structure factor $\Delta z$ is less than 0.08; an increased silicon content in the framework, $$\frac{(N - \Delta z)}{N},$$

of at least 0.5; and a cation equivalent expressed as a monovalent cation species, M+/Al, from 0.85 to 1.1 and the characteristic crystal structure of zeolite Y is indicated by an X-ray powder diffraction pattern having at least the d-spacings set forth broadly in Table A.

9. The zeolitic aluminosilicate of claim 8 wherein the change in defect structure $\Delta z$ is less than 0.05.

10. The zeolitic aluminosilicate of claim 8 wherein the cation equivalent expresses a multivalent cation species, $M^{+n}/Al$, where n is 2 or 3.

11. The zeolitic aluminosilicate of claim 1 wherein the value of "x" is 7.0.

12. The process for the preparation of a cracking catalyst comprising the treatment of a zeolitic aluminosilicate which has a mole ratio of oxides in the dehydrated state of $$(0.85\text{-}1.1)M_{2/n}O:Al_2O_3: X\ SiO_2$$

wherein M is a cation having a valence of "n"; "X" has a value greater than 6.0 has an x-ray powder diffraction pattern having at least the d-spacings of Table A; has extraneous silicon atoms in the crystal lattice in the form of framework SiO$_4$ tetrahedra; and has been ion-exchanged with an effective amount of at least one Group IIIA cation.

13. The cracking catalyst prepared by the process of claim 12.

14. The process according to claim 12 wherein the aluminosilicate is ion-exchanged with a multivalent cation selected from the group consisting of cerium, lanthanum, praseodymium, neodymium, promethium, samarium, europium, galodinium, terbium, dysprosium, holmium, erbium, thulium, ytterbium, lutetium and mixtures thereof.

15. The process of claim 12 wherein the zeolitic aluminosilicate is defined as having a chemical composition expressed in terms of mole fractions of framework tetrahedra as:

$$[Al_{(a-N)}Si_{b+(N-\Delta z)}\square_z]O_2$$

wherein: "$\square$" denotes the defect sites; "z" is the mole fraction of defect sites in the zeolite framework; "N" is the mole fraction of aluminum tetrahedra removed from the framework; "a" is the mole fraction of aluminum tetrahedra present in the framework of the starting zeolite; "b" is the mole fraction of the silicon tetrahedra present in the framework of the starting zeolite; "$(N-\Delta z)$" is the mole fraction increase in silicon tetrahedra; "$\Delta z$" is the net change in the mole fraction of defect sites;

$$\frac{b + (N - \Delta z)}{(a - N)}$$

has a value greater than 3; the change in defect structure factor $\Delta z$ is less than 0.08; an increased silicon content in the framework, $$\frac{(N - \Delta z)}{N},$$

of at least 0.5; and a cation equivalent expressed as a monovalent cation species, M+/Al, from 0.85 to 1.1 and the characteristic crystal structure of zeolite Y is indicated by an X-ray powder diffraction pattern having at least the d-spacings set forth broadly in Table A.

16. The process of claim 15 wherein the change in defect structure $\Delta z$ is less than 0.05.

17. The zeolitic aluminosilicate of claim 8 wherein the cation equivalent expresses a multivalent cation species, $M^{+n}/Al$, where n is 2 or 3.

18. The process of claim 12 wherein the value of "x" is greater than 7.

19. A catalyst for catalytic cracking a hydrocarbon feedstock wherein said catalyst comprises an effective amount of the zeolitic aluminosilicate of claim 12 and between about 1 and about 99 percent by weight of an inorganic oxide matrix.

20. The catalyst of claim 19 wherein the inorganic oxide matrix is at least one selected from the group consisting of clays, silicas, aluminas, silica-aluminas, silica-zirconias, silica-magnesias, alumina-borias, alumina-titanias and the like.

* * * * *